US012467083B2

United States Patent
Tokarski et al.

(10) Patent No.: US 12,467,083 B2
(45) Date of Patent: Nov. 11, 2025

(54) PRIMER SETS FOR DETECTION OF MYCOPLASMA PNEUMONIAE BACTERIA, METHOD FOR DETECTION OF MYCOPLASMA PNEUMOANIAE INFECTION, USE OF A PRIMER SET FOR DETECTION OF MYCOPLASMA PNEUMONIAE INFECTION

(71) Applicant: GENOMTEC S.A., Wroclaw (PL)

(72) Inventors: Miron Tokarski, Brzeg (PL); Izabela Piekla, Konopiska (PL); Malgorzata Malodobra-Mazur, Wroclaw (PL)

(73) Assignee: GENOMTEC S.A., Wroclaw (PL)

( * ) Notice: Subject to any disclaimer, the term of this patent is extended or adjusted under 35 U.S.C. 154(b) by 597 days.

(21) Appl. No.: 17/905,572

(22) PCT Filed: Mar. 17, 2021

(86) PCT No.: PCT/PL2021/050016
§ 371 (c)(1),
(2) Date: Sep. 2, 2022

(87) PCT Pub. No.: WO2021/187994
PCT Pub. Date: Sep. 23, 2021

(65) Prior Publication Data
US 2023/0125922 A1    Apr. 27, 2023

(30) Foreign Application Priority Data
Mar. 17, 2020    (PL) .......................... 433269

(51) Int. Cl.
*C12Q 1/6844*    (2018.01)
*C12Q 1/04*    (2006.01)
*C12Q 1/689*    (2018.01)

(52) U.S. Cl.
CPC ............. *C12Q 1/6844* (2013.01); *C12Q 1/04* (2013.01); *C12Q 1/689* (2013.01)

(58) Field of Classification Search
None
See application file for complete search history.

(56) References Cited

U.S. PATENT DOCUMENTS

2016/0237479 A1* 8/2016 Winchell ............. C12Q 1/6844

FOREIGN PATENT DOCUMENTS

| CN | 106282381 A | 1/2017 |
| CN | 109666752 A | 4/2019 |
| CN | 110408711 A | 11/2019 |

OTHER PUBLICATIONS

Sadeghi et al. (2021, Iran J Public Health 50(11):2172-2182).*
Gill et al. (2020, Avicenna/Med Biotech 12(1):2-8).*
Xin Yuan et al., Rapid detection of Mycoplasma pneumoniae by loop-mediated isothermal amplification assay. Medicine (Baltimore), 2018; 97(25), pp. 1-5. e10806.
Zi-Hong Cai et al. Diagnosis of mycoplasma pneumoniae by loop-mediated isothermal amplification: systematic review and meta-analysis, BMC Infectious Diseases, 2019, 19(173), pp. 1-20.
Maryam Arfaatabar et al. Rapid Detection of Mycoplasma pneumoniae by Loop-Mediated Isothermal Amplification (LAMP) in Clinical Respiratory Specimens, Iran J Public Health, 2019, 48(5), pp. 917-924.

* cited by examiner

*Primary Examiner* — Elizabeth C. Kemmerer
(74) *Attorney, Agent, or Firm* — Arrigo, Lee, Guttman & Mouta-Bellum LLP

(57) ABSTRACT

The first subject of the invention is a set of primers for amplifying nucleotide sequence of the *Mycoplasma pneumoniae* dnaE gene. The second subject of the invention is a method for detecting *Mycoplasma pneumoniae* bacteria. Another subject of the invention is a method for detecting an infection caused by the *Mycoplasma pneumoniae* bacterium. A fourth subject of the invention is a kit for detecting an infection caused by the *Mycoplasma pneumoniae* bacterium.

7 Claims, 3 Drawing Sheets

Specification includes a Sequence Listing.

PRIMER SETS FOR DETECTION OF MYCOPLASMA PNEUMONIAE BACTERIA, METHOD FOR DETECTION OF MYCOPLASMA PNEUMOANIAE INFECTION, USE OF A PRIMER SET FOR DETECTION OF MYCOPLASMA PNEUMONIAE INFECTION

FIELD OF THE INVENTION

The present invention relates to a primer set for the detection of *Mycoplasma pneumoniae* bacteria, a method for the detection of *Mycoplasma pneumoniae* using a primer set, and the use of a primer set for the detection of *Mycoplasma pneumoniae* bacteria. The invention is applicable in medical diagnostics.

BACKGROUND OF THE INVENTION

*Mycoplasma pneumoniae* is an atypical bacterium characterized by the lack of a cell wall. Moreover, atypical bacteria are among the intracellular pathogens that use energy in the form of ATP from the host cells.

*Mycoplasma pneumoniae* is one of the most common causes of upper and lower respiratory tract infections; it is believed to be responsible for approximately 40% of community-acquired pneumonia (CAP) in children and the elderly. Due to the lack of a cell wall, these bacteria are resistant to β-lactam antibiotics (the most frequently used group of first-line antibiotics), which is one of the main challenges in treating infections caused by *Mycoplasma pneumoniae*. Another challenge is the diagnostic process of infections caused by *Mycoplasma pneumoniae*. Atypical bacteria require specific growth conditions (cell lines or specialized media), which makes it difficult to detect bacteria in biological material by classical microbiological methods. Serological methods, on the other hand, are characterized by low sensitivity, generating a number of false-negative results mainly due to the serological window (delayed increase in the IgM antibody titre) or development of chronic phase of the infection (increase in the IgA antibody titre).

Therefore, there is a need to develop novel, faster, more sensitive and more specific methods of diagnosing infections caused by *Mycoplasma pneumoniae*, which will significantly advance effective treatment of the infections. Molecular tests involving detection of specific fragments of the *Mycoplasma pneumoniae* bacterial genome are one of the fastest, most sensitive and specific methods of pathogen diagnostics. An ideal solution would be a test developed for the needs of the primary health care units, during the first contact of patient with a doctor, enabling a quick diagnostic test (in no more than 15 minutes), which will allow for the selection of targeted therapy.

Chinese patent application CN101665826A discloses the use of the LAMP technique for the detection of *Mycoplasma pneumoniae* in clinical applications. The solution comprises detection of the amplification products, carried out for one hour, according to one of the methods: centrifugation until a white precipitate is obtained, adding a coloured developer and agarose gel electrophoresis. In Chinese patent applications CN101665827A, CN102618655A, CN107236798A, CN106282381A require from 30 to 90 minutes to perform the amplification reaction. In contrast, according to specification of another Chinese patent application, CN108642196A, the time required for the amplification reaction is 16, with another 20 min to deactivate the polymerase. In another Chinese patent application CN105349672A, the method of detecting amplification products disclosed comprises recording of a fluorescent signal (SYBR Green, calcein). The amplification reaction can be performed according to the solution in 13, with the optimal time being 60 min. The minimum concentration of *M. pneumoniae* DNA that can be detected is $1.5*/10^{-7}$ ng/μL. Another Chinese patent application CN105238860A discloses the use of two methods for detecting the products of an amplification reaction carried out for 45 minutes. The first method involves adding calcein to the post-reaction mixture and observing the color change. The second is based on the observation of differences in turbidity before and after the reaction without the addition of calcein. Similarly, in the next Chinese patent application CN103276083A, the result of the reaction, which takes 60 min, is determined by the turbidimetric method. Another Chinese patent application CN109609603A describes a method of detecting the P1 gene, specific to *Mycoplasma pneumoniae*, by combining isothermal amplification (LAMP) and a nanosensor. Detection of the amplification products, within 60 min, according to this method, targeting the P1 gene, is carried out by means of a nanosensor. The method has a sensitivity range of 60 ng-600 fg of DNA content in the reaction mixture. The next Chinese patent application CN104818333A discloses a set of primers, among others for LAMP amplification and *Mycoplasma pneumoniae* detection, which are placed on a microfluidic chip, wherein the amplification reaction takes 50 min and the copy number is $5*10^2$/μl. The LAMP method was also used in the Chinese patent application CN109666752A, but the amplification step takes 20-30 minutes to an hour, and the reaction result is determined by the turbidimetric method. Similarly, in the Canadian patent application CA2461950A1, the probe hybridization reaction is carried out for 30 min, followed by hydrolysis with an alkaline reagent for 10 min. The amplification reaction is carried out for 40 min. U.S. Pat. No. 10,233,504B2 discloses primer sets for use in the LAMP reaction to detect *M. pneumoniae*. The amplification reaction is carried out for 30 to 60 minutes and is terminated by incubating the genetic material for 2-10 minutes and at a temperature of 80-95° C. The reaction products can be detected by observing the fluorescence (calcein). On the other hand, in the Japanese patent application JP2006158220A, the amplification reaction (LAMP) is carried out for 60 minutes, with a minimum content of 0.01 pg of bacterial DNA, which corresponds to the amount of 12 bacteria in the sample. The reaction progress is monitored by measuring the turbidity of the reaction mixture (turbidimetry).

The LAMP method is disclosed, for example, in WO0028082, WO0224902. The mentioned patent applications in most cases do not describe the sensitivity and the detection limit of *Mycoplasma pneumoniae* bacteria. The detection method in some of the patent applications mentioned does not allow for quantitative measurement, and the detection is of the end-point type, using agarose gel or other markers based on the color change of the reaction mixture in the case of a positive result of the amplification reaction (Hydroxy-Naphthol-Blue, Calceine). Some of the patent applications are realized in the Real-Time technology, enabling quantitative measurement. However, the kits developed and described are still not applicable in POC (point of care) diagnostics, and their main application concerns laboratories.

Therefore, there is still a need to provide such set of primers for the diagnosis of *Mycoplasma pneumoniae* using the LAMP method, intended for use in primary care clinics, which allows for detecting the bacteria at a very low detection limit (≥5 copies/µl) in a short time (≤15 min). Surprisingly, the above-mentioned problem was solved by the present invention.

BRIEF SUMMARY OF THE INVENTION

The first subject of the invention is a set of primers for amplifying the nucleotide sequence of the *Mycoplasma pneumoniae* dnaE gene, characterized in that it contains a set of internal primers with the following nucleotide sequences a) and b), as well as a set of external primers containing the following nucleotide sequences c) and d) specific for the selected fragment of the *Mycoplasma pneumoniae* dnaE gene:
  a) 5 'ACGGCATTATTGTGGAAGTG 3' (the nucleic sequence SEQ ID NO: 3 or a sequence complementary thereto or resulting from single nucleotide exchanges, single nucleotide substitution or deletion)–(any nucleotide sequence between 18 and 30 bp in length complementary to the dnaE gene sequence) whether or not linked by a TTTT bridge to the sequence 5' CAGCTAAAAACAACTCATCCCAGTC 3'-(the nucleic sequence SEQ ID NO: 5 or a sequence complementary thereto or resulting from single nucleotide exchanges, single nucleotide substitution or deletion)
  b) 5' CGCTCATCAAAGCCCTTG 3'-(the nucleic sequence SEQ ID NO: 4 or a sequence complementary thereto or resulting from single nucleotide exchanges, single nucleotide substitution or deletion)–(any nucleotide sequence between 18 and 30 bp in length complementary to the dnaE gene sequence, whether or not linked by a TTTT bridge to the sequence 5' TGCGGTTAAAGCTAAGACTCACAG 3'-(the nucleic sequence SEQ ID NO: 6 or a sequence complementary thereto or resulting from single nucleotide exchanges, single nucleotide substitution or deletion)
  c) 5' GCTATTACAAGAGTTAAACGCAC 3' the nucleic sequence SEQ ID NO: 1 or a sequence complementary thereto or resulting from single nucleotide exchanges, single nucleotide substitution or deletion, and
  d) 5' GTCGATAACTTTATTGACGGTAA 3' the nucleic sequence SEQ ID NO: 2 or a sequence complementary thereto or resulting from single nucleotide exchanges, single nucleotide substitution or deletion In a preferred embodiment of the invention, the primer set comprises a set of loop primer sequences comprising nucleic sequences contained in or complementary to the *Mycoplasma pneumoniae* dnaE gene SEQ ID NO: 7 5' AGCGGCTTGGTTTCAATCG 3' and SEQ ID NO: 8: 5' AAACCTCGTGGAATACTTAGTGGC 3' or sequences complementary thereto or resulting from single nucleotide exchanges, single nucleotide substitution or deletion.

The second subject of the invention is a method for detecting *Mycoplasma pneumoniae* bacteria, characterized in that a selected region of the nucleic sequence of the *Mycoplasma pneumoniae* genome (a fragment of the dnaE gene) is amplified using a primer set according to the first subject of the invention, the amplification method being the LAMP method.

In a preferred embodiment, the amplification is carried out with a temperature profile of: 67.5° C., 40 min.

In a further preferred embodiment of the invention, an end-point reaction is carried out with a temperature profile of 80° C., 5 min.

A third subject of the invention is a method of detecting an infection caused by the *Mycoplasma pneumoniae* bacterium, characterized in that it comprises a detection method as defined in the second subject of the invention.

A fourth subject of the invention is a kit for detecting an infection caused by the *Mycoplasma pneumoniae* bacterium, characterized in that it comprises a primer set according to as defined in the first subject of the invention.

In a preferred embodiment of the invention, the infection detection kit comprises 5.0 µl WARMSTART LAMP Master Mix.

In a further preferred embodiment of the invention, individual amplification primers as defined in the first subject of the invention, the primers having the following concentrations: 0.12 µM F3, 0.12 µM B3, 0.93 µM FIP, 0.93 µM BIP, 0.23 µM LoopF, 0.23 µM LoopB; BSA-0.25 mg/ml; D-(+)-Trehalose dihydrate-6%; fluorescent tag interacting with double-stranded DNA-EVAGREEN≤1× or Fluorescent Dye≤0.5 µl or GREENFLUORESCENT Dye≤1 µl or Syto-13≤16 µM or SYTO-82≤16 µM or other fluorescent dye interacting with double-stranded DNA at a concentration that does not inhibit the amplification reaction.

The advantage of the primer sets according to the invention for the detection of *Mycoplasma pneumoniae*, as well as the method of detecting *Mycoplasma pneumoniae* infection and the method of detecting the amplification products, is that they can be used in medical diagnostics at the point of care (POC) in the target application on a portable genetic analyzer. Lyophilisation of the reaction mixtures according to the invention allows the diagnostic kits to be stored at room temperature without reducing the diagnostic parameters of the tests. In turn, the use of a fluorescent dye to detect the amplification product increases sensitivity of the method, allows for lowering the detection limit (down to 5 copies/µl), as well as enables quantitative measurement of bacteria in the tested sample.

BRIEF DESCRIPTION OF THE DRAWINGS

Exemplary embodiments of the invention are shown in the figures.

FIG. 1: lane 1: mass marker (Quick-Load® Purple 100 bp DNA Ladder, NewEngland Biolabs); lane 2: NTC; lane 3:5 copies of MP; lane 4:10 copies of MP; lane 5:20 copies of MP; lane 6:25 copies of MP; lane 7:50 copies of MP; lane 8:100 copies of MP; lane 9:1,000 copies of MP.

FIG. 3: lane 1: mass marker (Quick-Load® Purple 100 bp DNA Ladder, NewEngland Biolabs); lanes 2 and 3: *Mycoplasma genitalium*; lanes 4 and 5: *Klebsiella pneumoniae*; lanes 6 and 7: *Bordetella pertussis*; lanes 8 and 9: *Streptococcus pyogenes*; lanes 10 and 11: *Staphylococcus aureus* methicillin-sensitive (MSSA); lanes 12 and 13: methicillin-resistant *Staphy-* lococcus aureus (MRSA); lanes 14 and 15: *Enterococcus faecalis*; lanes 16 and 17: *Enterococcus faecium*; lanes 18 and 19: *Pseudomonas aeruginosa*; lanes 20 and 21: *Moraxella catarrhalis*; lanes 22 and 23: *Acinetobacter baumannii*; lanes 24 and 25: *Listeria monocytogenes*; lanes 26 and 27: *Legionella pneumophila*; lanes 28 and 29: *Mycoplasma hominis*; lanes 30 and 31: *Haemophilus ducreyi*; lanes 32 and 33: *Escherichia coli*; lanes 34 and 35: *Ureaplasma urealyticum*; lanes 36 and 37: *Campylobacter jejuni*; lanes 38 and 39: *Candida albicans*; lanes 40 and 41: *Haemophilus influenzae*; lanes 42 and 43: *Chlamydophila pneumoniae*; lanes 44 and 45: *Mycoplasma pneumoniae*; lanes 46, 47, 48, 49: NTC; lane 50: mass marker (Quick-Load® Purple 100 bp DNA Ladder, NewEngland Biolabs).

Figure 4:
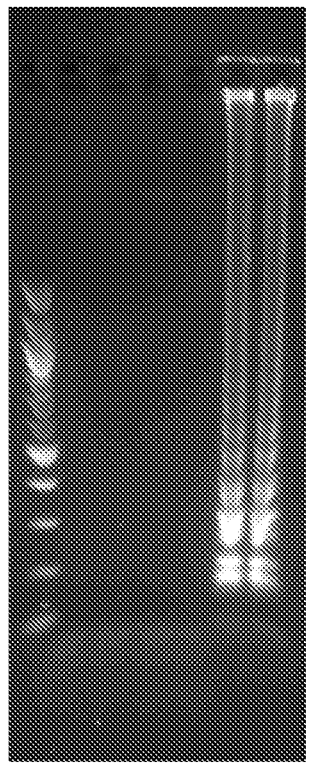

FIG. 4: lane 1: mass marker (Quick-Load® Purple 100 bp DNA Ladder, NewEngland Biolabs); lanes 2 and 3: NTC; lanes 4 and 5: human DNA; lanes 6 and 7: *Mycoplasma pneumoniae*.

DETAILED DESCRIPTION OF THE INVENTION

Example 1. Primer Sequences

The sequences of specific oligonucleotides used for the detection of *Mycoplasma pneumoniae* genetic material using LAMP technology are presented and characterized below.

1. MP dnaEF3 oligonucleotide sequence: 5' GCTATTA-CAAGAGTTAAACGCAC 3' (SEQ ID NO: 1) is identical to the *Mycoplasma pneumoniae* dnaE gene (5'-3' strand) which is adjacent to the F2 primer at the 3' end.
2. MP dnaEB3 oligonucleotide sequence: 5' GTCGA-TAACTTTATTGACGGTAA 3' (SEQ ID NO: 2) is a complementary fragment of the *Mycoplasma pneumoniae* dnaE gene (5'-3' strand) 169 nucleotides away from the 3' end of the oligonucleotide 1.
3. MP dnaEF2 oligonucleotide sequence: 5' ACGGCAT-TATTGTGGAAGTG 3' (SEQ ID NO: 3) is a sequence identical to the *Mycoplasma pneumoniae* dnaE gene (5'-3' strand) immediately adjacent to the 3' end of the oligonucleotide 1.
4. MP dnaEB2 oligonucleotide sequence: 5' CGCTCAT-CAAAGCCCTTG 3' (SEQ ID NO: 4) is a complementary fragment of the *Mycoplasma pneumoniae* dnaE gene (5'-3' strand) 149 nucleotides away from the 3' end of the oligonucleotide 1.
5. MP dnaEF1c oligonucleotide sequence: 5' CAGCTAAAAACAACTCATCCCAGTC 3' (SEQ ID NO:5) is a complementary fragment of the *Mycoplasma pneumoniae* dnaE gene (5'-3' strand) 49 nucleotides away from the 3' end of the oligonucleotide 1.
6. MP dnaEB1c oligonucleotide sequence: 5' TGCGGT-TAAAGCTAAGACTCACAG 3' (SEQ ID NO: 6) is a sequence identical to the *Mycoplasma pneumoniae* dnaE gene (5'-3' strand) 83 nucleotides away from the 3' end of the oligonucleotide 1.
7. MP dnaELoopF oligonucleotide sequence: 5' AGCGGCTTGGTTTCAATCG 3' (SEQ ID NO: 7).
8. MP dnaELoopB oligonucleotide sequence: 5' AAACCTCGTGGAATACTTAGTGGC 3' (SEQ ID NO:8).

The sequences of the F1c and F2 oligonucleotides have been preferably linked by a TTTT bridge and used as FIP.

The sequences of the B1c and B2 oligonucleotides have preferably been linked by a TTTT bridge and used as BIP.

Example 2

The method of amplifying the *Mycoplasma pneumoniae* dnaE gene with the use of the oligonucleotides characterized in Example 1 using the LAMP technology with the following composition of the reaction mixture.
5.0 µl WARMSTART LAMP 2× Master Mix
0.12 µM F3
0.12 µM B3
0.93 µM FIP
0.93 µM BIP
0.23 µM LoopF
0.23 µM LoopB
BSA-0.25 mg/ml
D-(+)-Trehalose dihydrate-6%
Fluorescent tag interacting with double-stranded DNA-EVAGREEN≤1× or Fluorescent dye 50× (New England Biolabs) in the amount of 0.5 µl or GREENFLUORESCENT Dye (Lucigen) in the amount of ≤1 µl or Syto-13≤16 µM or SYTO-82≤16 µM or other fluorescent dye that interacts with double-stranded DNA at a concentration that does not inhibit the amplification reaction.
DNA template ≥5 copies per reaction.
Total reaction volume made up to 10 µl with DNase- and RNase-free water.
Fluorescent tag interacting with double-stranded DNA-EVAGREEN≤1× or Fluorescent dye 50× (New England Biolabs) in the amount of 0.5 µl or GREENFLUORESCENT Dye (Lucigen) in the amount of ≤1 µl or Syto-13≤16 µM or SYTO-82≤16 µM or other fluorescent dye that interacts with double-stranded DNA at a concentration that does not inhibit the amplification reaction.
DNA template ≥5 copies per reaction.
Total reaction volume made up to 10 µl with DNase- and RNase-free water.

Example 3

The method of amplification of the *Mycoplasma pneumoniae* dnaE gene with the use of the oligonucleotides characterized in Example 1 and Example 2 using the LAMP technology with the composition of the reaction mixture characterized in Example 3 with the following temperature profile:
1) 67.5° C., 40 min
2) preferably for end-point reactions 80° C., 5 min.

Example 4

Method of amplification and detection of the *Mycoplasma pneumoniae* dnaE gene with the use of the oligonucleotides characterized in Example 1 and Example 2 using the LAMP technology with the composition of the reaction mixture characterized in Example 3 with the temperature profile characterized in Example 4 and the detection method described below.
Fluorescent dye used, capable of interacting with double-stranded DNA, added to the reaction mixture at 0.5 µl of EVAGREEN 20×; 0.5 µL or a concentration of ≤1×; ≤16 µM respectively for GREENFLUORESCENT Dye (Lucigen); SYTO-13 and SYTO-82 before starting the reaction, real-time and/or end-point measurement. Excitation wavelength in the range similar to the FAM dye-490-500 nm (optimally 494 nm) for EVAGREEN dyes; Fluorescent dye 50× (New England Biolabs), GREENFLUORESCENT Dye (Lucigen); SYTO-13 and for the SYTO-82 dye 535 nm (optimally 541 nm) emission wavelength in the range 509-530 nm (optimally 518 nm) for EVAGREEN dyes; GREENFLUORESCENT Dye (Lucigen); SYTO-13 and for the SYTO-82 dye 556 nm (optimally 560 nm), the method of detection, change recording time starting from 8 minutes from the start of the reaction for *Mycoplasma pneumoniae* and the negative control.

Example 5

The method of preparation and lyophilization of reagents for the detection of the amplification and detection of the *Mycoplasma pneumoniae* dnaE gene with the use of the oligonucleotides characterized in Example 1 and Example 2 using the LAMP technology with the composition of the reaction mixture characterized in Example 3 with the temperature profile characterized in Example 4 and the detection method described in Example 5.

Example 6. Description of the Lyophilization Process

The reaction components were mixed according to the composition described in Example 3, excluding the template DNA, to a total volume of 10 µl. The mixture was transferred to 0.2 ml tubes and subjected to the lyophilization process according to the parameters below.

The mixture placed in test tubes was pre-cooled to −20° C. for 2 hours. Then the lyophilization process was carried out at the temperature of −80° C. for 3 hours under the pressure of $5^{-2}$ mBar.

Example 7. Sensitivity of the Method

Figure 2:
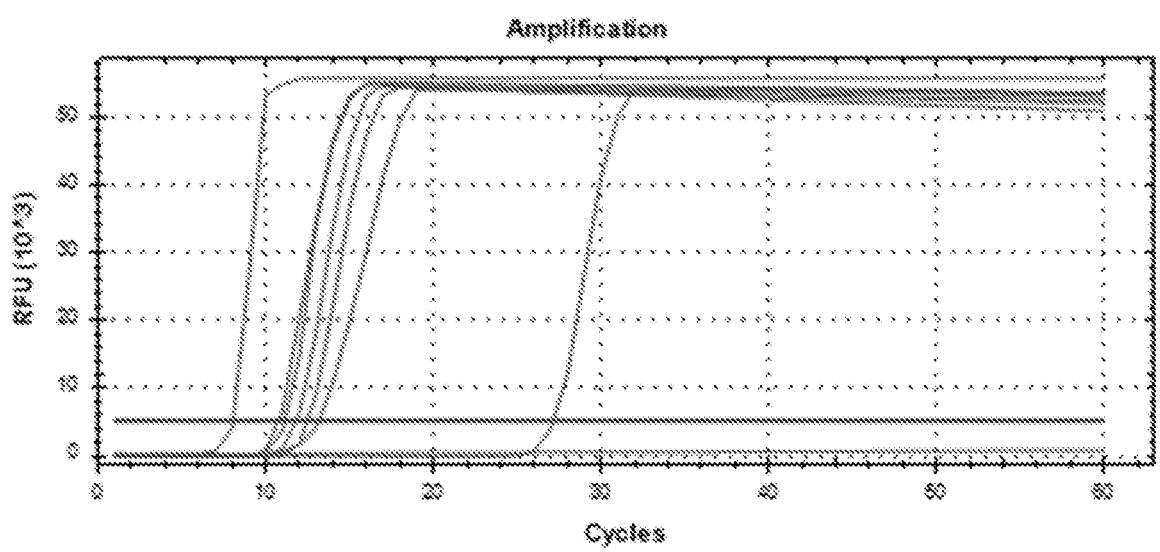
FIG. 2 illustrates sensitivity of the method of the invention as measured by setting up serial dilutions of the Amplirun® *Mycoplasma Pneumoniae* DNA Control standard (Vircell Microbiologist) in the range of 1,000-5 copies/µl DNA standard, where the product amplification was measured in real time. The real-time *Mycoplasma pneumoniae* detection results are shown in Table 1, indicating the minimum time required to detect the fluorescence signal.
Figure 3:
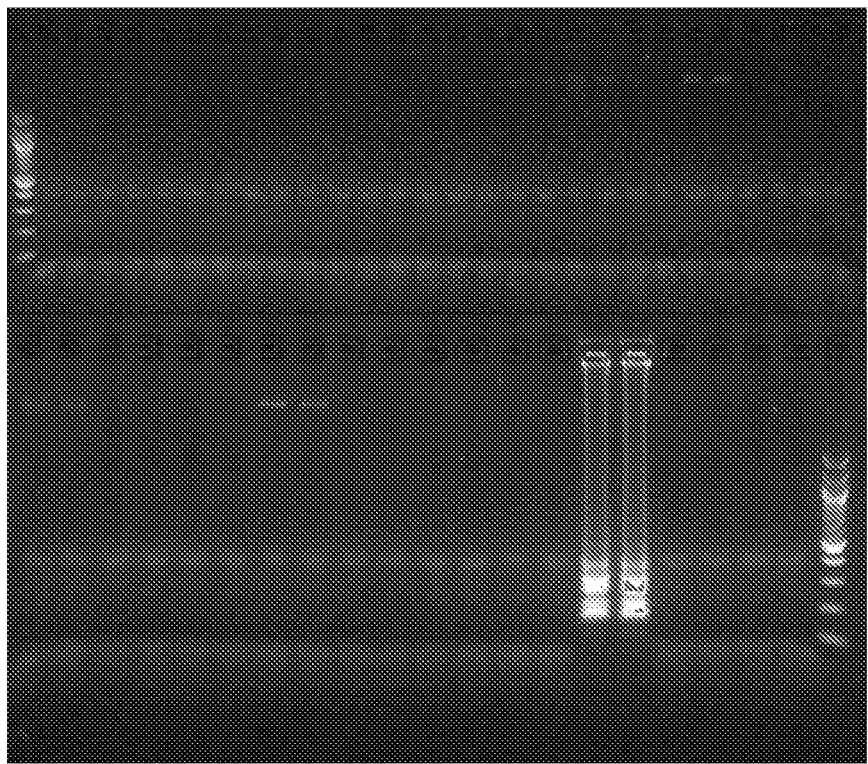
FIGS. 3 and 4 illustrate specificity of the method of the invention with standard templates of a range of pathogens potentially present in the biological material to be tested as natural physiological flora, possibly resulting from co-infection or having similar genomic sequences.

Sensitivity was determined by by setting up serial dilutions of the Amplirun® *Mycoplasma Pneumoniae* DNA Control standard (Vircell Microbiologist); with a minimum amount of 5 copies of bacteria in the reaction mixture where the product amplification was measured in real time-FIG. 2 (RealTime-LAMP for the dilution series).

The time after which the detection of emitted fluorescence is possible for individual samples is shown in Table 1.

The characterized primers enable the detection of *Mycoplasma pneumoniae* bacteria by detecting the dnaE gene fragment at a minimum number of 5 copies per reaction mixture.

TABLE 1

Time required for fluorescence detection for each dilution of the *Mycoplasma pneumoniae* DNA standard (Amplirun ® *Mycoplasma Pneumoniae* DNA Control, Vircell Microbiologist).

| Sample | Time to exceed the baseline fluorescence [min] |
|---|---|
| MP NTC | Not determined |
| MP 5 copies | 11.77 |
| MP 10 copies | 27.14 |
| MP 20 copies | 13.15 |
| MP 25 copies | 12.45 |
| MP 50 copies | 11.13 |
| MP 100 copies | 10.74 |
| MP 1,000 copies | 8.05 |

Figure 1:
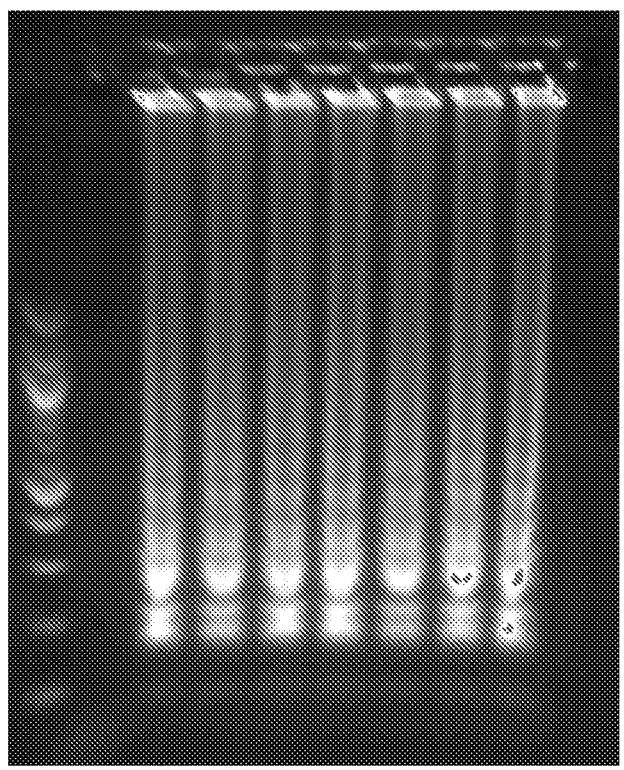
FIG. 1 shows sensitivity characteristics of the method, where a specific signal was obtained with the template: Amplirun® *Mycoplasma Pneumoniae* DNA Control, (Vircell Microbiologist) in the range of 1,000-5 copies/µl, but no product in NTC.

The advantage of the amplification method and the oligonucleotides described herein over the tests based on RealTime-LAMP technology is due to much higher sensitivity, which is shown in FIG. 1 and the reduction of analysis time presented in FIG. 2 and Table 1.

```
Sequence listing
<110> Genomtec S.A.

<120> Primer sets for detection of Mycoplasma pneumoniae bacteria, method for
detection of Mycoplasma pneumoaniae infection, use of a primer set for
detection of Mycoplasma pneumoniae infection <170> PatentIn version 3.5

<210> 1 MP dnaEF3

<211> 24

<212> DNA

<213> artificial

<223> primer

<400> 1

GCTATTACAAGAGTTAAACGCAC     23

<210> 2 MP dnaEB3

<211> 24

<212> DNA

<213> artificial
```

-continued

<223> primer

<400> 2

GTCGATAACTTTATTGACGGTAA 23

<210> 3 MP dnaEF2:

<211> 24

<212> DNA

<213> artificial

<223> primer

<400> 3

ACGGCATTATTGTGGAAGTG 20

<210> 4 MP dnaEB2

<211> 24

<212> DNA

<213> artificial

<223> primer

<400> 4

CGCTCATCAAAGCCCTTG 18

<210> 5 MP dnaEF1c

<211> 24

<212> DNA

<213> artificial

<223> primer

<400> 5

CAGCTAAAAACAACTCATCCCAGTC 25

<210> 6 MP dnaEB1c

<211> 24

<212> DNA

<213> artificial

<223> primer

<400> 6

TGCGGTTAAAGCTAAGACTCACAG 24

<210> 7 MP dnaELoopF

<211> 24

<212> DNA

<213> artificial

<223> primer

<400> 7

AGCGGCTTGGTTTCAATCG 19

<210> 8 MP dnaELoopB

<211> 24

<212> DNA

<213> artificial

<223> primer

<400> 8

AAACCTCGTGGAATACTTAGTGGC 24

<210> 9 Gen dnaE Mycoplasma pneumoniae

<211> 24

<212> DNA

<213>

<223> gen

<400> 9

```
   1 atgaccagtc ccactagcct agatcagctc aaacagcaaa tcaaaatagc tcccatagtg
  61 gagcactatg ccattaagct aaaaagaag gggaaggact tgtggcact ctgtcccttt
 121 catgctgacc aaaaccctc gatgacggtg tcagttgcaa agaacatctt taagtgtttc
 181 tcgtgtcagg tgggcggtga tgggattgct tttatccaaa aaattgatca ggtagattga
 241 aaaacggcgc tcaataaggc acttagtatt ctcaatcttg actcacaata cgctgttaac
 301 ttttacctta aggaagttga cccaaagtta aagcgctatt gggatctaca cagtgcccta
 361 gtcgattact atcaaacccg gttaaagcta gagcccaaag agcagggttt gacttactta
 421 actgaaacac gaaagttaag tcctcaagta attgaacgct tcagttggg tttagcgttt
 481 actttagaag accagtattt tctacccagt ctcttaaact atccctgaat tagcccggca
 541 attgaaaagg cagagctctg ttttgctact gaaaaattcc cagaagcttt aggatttttt
 601 aaccaacaaa cgcattatgc aacctttaag agccggatta tgattccgat ccatgacctt
 661 aagggtaatc cagtaggttt ttcggggcgt gcactgcaaa aaacggaaaa gattaaatac
 721 aaaaacagtg cagaacacca gtggtttaag aagagtgaat tgttatttaa cttccaccgg
 781 attgataaaa acacactaaa gctgtattta gttgagggtt acttcgatgt ctttgccctt
 841 actagcgctg ggattggtga tgtagtgggc ttaatgggtt tagccttgag tgaaagccac
 901 attattgcct ttcaacagca actaaaaagcg ctagaaacag tggtcttggc actcgataat
 961 gatacagcgg gtcacgatgc tacttttaag ctattacaag agttaaacgc acacggcatt
1021 attgtggaag tggtcgattg aaaccaagcc gcttacaaag actgggatga gttgttttta
1081 gctgaaggta gtgatgcggt taaagctaag actcacaggg ttttaaaccct cgtggaatac
1141 ttagtggctt actttaaaac caagggcttt gatgagcgga ttaccgtcaa taaagttatc
1201 gacattattg cacaaaacca gaaagtaaca gctgacacta gctttagccg ctttttgtgt
1261 cagaaattac agcaattgtt gcaatacagt gatgtggaaa cactgttcac acaattacag
1321 cagcaaaagc tcaaagtaaa agttaataaa actacaactt ttacccaaag agccccgatt
1381 tacgaatcag tggttggtgt ggttgataat agtttttagaa atgaatcgca gccggttgcc
1441 attaccaagg agtttttagt cgaaacaac tgaaaggaga ccaaggaacg tgtatttcat
1501 gctgaaatct tcgcttacgt actgttagat aagcagtttt tagtcgaatt aaagcaatct
1561 gatttagatg aattgtttgc ttcattgcaa acaccgttgt ttgatgttgc cttttttatt
1621 gataaagcgc ggcttattg agctaaggtg caagagcctg attgggctgt gtttaacagt
1681 attttagggg aacaacaagc aatgtttcca acaacttttt tagcgcaaat taaggagttc
1741 ttttttaaaca aatcactctc atatgaccct gaggattatg aggaagattt acagttttt
```

1801 cggcaactaa ttgtgaaaca aaaagagctt ttaaaatatt ttaaaagcat ggttgagcac 1861 taa

---

SEQUENCE LISTING

<160> NUMBER OF SEQ ID NOS: 9

<210> SEQ ID NO 1
<211> LENGTH: 23
<212> TYPE: DNA
<213> ORGANISM: artificial
<220> FEATURE:
<223> OTHER INFORMATION: primer

<400> SEQUENCE: 1
gctattacaa gagttaaacg cac                    23

<210> SEQ ID NO 2
<211> LENGTH: 23
<212> TYPE: DNA
<213> ORGANISM: artificial
<220> FEATURE:
<223> OTHER INFORMATION: primer

<400> SEQUENCE: 2
gtcgataact ttattgacgg taa                    23

<210> SEQ ID NO 3
<211> LENGTH: 20
<212> TYPE: DNA
<213> ORGANISM: artificial
<220> FEATURE:
<223> OTHER INFORMATION: primer

<400> SEQUENCE: 3
acggcattat tgtggaagtg                        20

<210> SEQ ID NO 4
<211> LENGTH: 18
<212> TYPE: DNA
<213> ORGANISM: artificial
<220> FEATURE:
<223> OTHER INFORMATION: primer

<400> SEQUENCE: 4
cgctcatcaa agcccttg                          18

<210> SEQ ID NO 5
<211> LENGTH: 25
<212> TYPE: DNA
<213> ORGANISM: artificial
<220> FEATURE:
<223> OTHER INFORMATION: primer

<400> SEQUENCE: 5
cagctaaaaa caactcatcc cagtc                  25

<210> SEQ ID NO 6
<211> LENGTH: 24
<212> TYPE: DNA
<213> ORGANISM: artificial
<220> FEATURE:
<223> OTHER INFORMATION: primer

<400> SEQUENCE: 6
tgcggttaaa gctaagactc acag                                            24

<210> SEQ ID NO 7
<211> LENGTH: 19
<212> TYPE: DNA
<213> ORGANISM: artificial
<220> FEATURE:
<223> OTHER INFORMATION: primer

<400> SEQUENCE: 7
agcggcttgg tttcaatcg                                                  19

<210> SEQ ID NO 8
<211> LENGTH: 24
<212> TYPE: DNA
<213> ORGANISM: artificial
<220> FEATURE:
<223> OTHER INFORMATION: primer

<400> SEQUENCE: 8
aaacctcgtg gaatacttag tggc                                            24

<210> SEQ ID NO 9
<211> LENGTH: 1863
<212> TYPE: DNA
<213> ORGANISM: Mycoplasma pneumoniae

<400> SEQUENCE: 9
atgaccagtc ccactagcct agatcagctc aaacagcaaa tcaaaatagc tcccatagtg      60
gagcactatg ccattaagct aaaaagaag gggaaggact tgtggcact ctgtcccttt      120 catgctgacc aaaaccctc gatgacggtg tcagttgcaa agaacatctt taagtgtttc      180
tcgtgtcagg tgggcggtga tgggattgct tttatccaaa aaattgatca ggtagattga      240
aaaacggcgc tcaataaggc acttagtatt ctcaatcttg actcacaata cgctgttaac      300
ttttacctta aggaagttga cccaaagtta aagcgctatt gggatctaca cagtgcccta      360
gtcgattact atcaaacccg gttaaagcta gagcccaaag agcagggttt gacttactta      420
actgaaacac gaaagttaag tcctcaagta attgaacgct tcagttggg tttagcgttt      480 actttagaag accagtattt tctacccagt ctcttaaact atccctgaat tagcccggca      540
attgaaaagg cagagctctg ttttgctact gaaaaattcc cagaagcttt aggatttttt      600
aaccaacaaa cgcattatgc aacctttaag agccggatta tgattccgat ccatgacctt      660
aagggtaatc cagtaggttt ttcggggcgt gcactgcaaa aaacggaaaa gattaaatac      720
aaaaacagtg cagaacacca gtggtttaag aagagtgaat tgttatttaa cttccaccgg      780
attgataaaa acacactaaa gctgtattta gttgagggtt acttcgatgt ctttgcccctt      840 actagcgctg ggattggtga tgtagtgggc ttaatgggtt tagccttgag tgaaagccac      900
attattgcct tcaacagca actaaaagcg ctagaaacag tggtcttggc actcgataat      960
gatacagcgg gtcacgatgc tacttttaag ctattacaag agttaaacgc acacggcatt     1020
attgtggaag tggtcgattg aaaccaagcc gcttacaaag actgggatga gttgtttta      1080 gctgaaggta gtgatgcggt taaagctaag actcacaggg ttttaaaccct cgtggaatac     1140 ttagtggctt acttaaaaac caggggcttt gatgagcgga ttaccgtcaa taaagttatc     1200
gacattattg cacaaaacca gaaagtaaca gctgacacta gctttagccg ctttttgtgt     1260
cagaaattac agcaattgtt gcaatacagt gatgtggaaa cactgttcac acaattacag     1320

-continued

```
cagcaaaagc tcaaagtaaa agttaataaa actacaactt ttacccaaag agccccgatt   1380
tacgaatcag tggttggtgt ggttgataat agttttagaa atgaatcgca gccggttgcc   1440
attaccaagg agtttttagt cgaaaacaac tgaaaggaga ccaaggaacg tgtatttcat   1500
gctgaaatct tcgcttacgt actgttagat aagcagtttt tagtcgaatt aaagcaatct   1560
gatttagatg aattgtttgc ttcattgcaa acaccgttgt ttgatgttgc ccttttttatt  1620
gataaagcgc ggctttattg agctaaggtg caagagcctg attgggctgt gtttaacagt   1680
attttagggg aacaacaagc aatgtttcca acaacttttt tagcgcaaat taaggagttc   1740
tttttaaaca aatcactctc atatgaccct gaggattatg aggaagattt acagtttttt   1800
cggcaactaa ttgtgaaaca aaaagagctt ttaaaatatt ttaaaagcat ggttgagcac   1860
taa                                                                 1863
```

The invention claimed is:

1. A primer set for amplifying a nucleotide sequence of a *Mycoplasma pneumoniae* dnaE gene, comprising an internal primer set with the following nucleotide sequences a) and b), and also external primer set comprising the following nucleotide sequences c) and d):

a) 5 'ACGGCATTATTGTGGAAGTG 3' (SEQ ID NO: 3) or a nucleotide sequence resulting from a single nucleotide exchange, single nucleotide substitution, or single nucleotide deletion of SEQ ID NO:3-linked at a 5' end by a TTTT bridge to the sequence 5' CAGCTAAAAACAACTCATCCCAGTC 3' (SEQ ID NO: 5) or a sequence resulting from a single nucleotide exchange, single nucleotide substitution or single nucleotide deletion of SEQ ID NO: 5, b) 5' CGCTCATCAAAGCCCTTG 3' (SEQ ID NO: 4) or a sequence resulting from a single nucleotide exchange, single nucleotide substitution or single nucleotide deletion of SEQ ID NO: 4 linked at a 5' end by TTTT bridge to the sequence 5' TGCGGTTAAAGCTAAGACT-CACAG 3' (SEQ ID NO: 6) or resulting from a single nucleotide change, single nucleotide substitution or single nucleotide deletion of SEQ ID NO:6, c) 5' GCTATTACAAGAGTTAAACGCAC 3' (SEQ ID NO: 1) or resulting from a single nucleotide exchange, single nucleotide substitution or single nucleotide deletion of SEQ ID NO: 1, and d) 5' GTCGATAACTTTATTGACGGTAA 3' (SEQ ID NO: 2) or resulting from a single nucleotide exchange, single nucleotide substitution or single nucleotide deletion of SEQ ID NO: 2.

2. The primer set of claim 1, further comprising a set of loop primer sequences comprising 5' AGCGGCTTGGTTT-CAATCG 3' (SEQ ID NO:7) or resulting from a single nucleotide exchange, single nucleotide substitution or single nucleotide deletion of SEQ ID NO: 7 and 5' AAACCTCGTGGAATACTTAGTGGC 3' (SEQ ID NO: 8) or resulting from a single nucleotide exchange, single nucleotide substitution or single nucleotide deletion of SEQ ID NO: 8.

3. A method for detecting *Mycoplasma pneumoniae* bacteria in a sample of human, animal or environmental origin, wherein a selected region of the bacterial genome nucleotide sequence is amplified using the primer set of claim 2, the amplification method being the loop-mediated isothermal amplification (LAMP) method.

4. The method of virus detection of claim 3, wherein the amplification is carried out with a temperature profile of: 67.5° C., 40 min.

5. The method of claim 3, wherein an end-point reaction is carried out with a temperature profile of 80° C., 5 min.

6. A kit for the detection of *Mycoplasma pneumoniae* infection, comprising the primer set of claim 2.

7. An infection detection kit comprising the amplification primers of claim 2, wherein the primers have the following concentrations:

```
0.12 μM
                              (SEQ ID NO: 1)
5' GCTATTACAAGAGTTAAACGCAC 3', 0.12 μM
                              (SEQ ID NO: 2)
5' GTCGATAACTTTATTGACGGTAA 3', 0.93 μM
                              (SEQ ID NO: 5)
5' CAGCTAAAAACAACTCATCCCAGTC 3'
combined with (SEQ ID NO: 3)
5' ACGGCATTATTGTGGAAGTG 3', 0.93 μM
                              (SEQ ID NO: 6)
5' TGCGGTTAAAGCTAAGACTCACAG 3'
combined with (SEQ ID NO: 4)
5' CGCTCATCAAAGCCCTTG 3', 0.23 μM
                              (SEQ ID NO: 7)
5' AGCGGCTTGGTTTCAATCG 3',
and 0.23 μM
                              (SEQ ID NO: 8)
5' AAACCTCGTGGAATACTTAGTGGC 3'.
```

* * * * *